(12) United States Patent
Kmetz et al.

(10) Patent No.: US 9,446,989 B2
(45) Date of Patent: Sep. 20, 2016

(54) CARBON FIBER-REINFORCED ARTICLE AND METHOD THEREFOR

(71) Applicants: Michael A. Kmetz, Colchester, CT (US); Sam Frueh, Vernon, CT (US)

(72) Inventors: Michael A. Kmetz, Colchester, CT (US); Sam Frueh, Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 384 days.

(21) Appl. No.: 13/729,528

(22) Filed: Dec. 28, 2012

(65) Prior Publication Data

US 2015/0141235 A1    May 21, 2015

(51) Int. Cl.
| | |
|---|---|
| C04B 35/80 | (2006.01) |
| C04B 35/83 | (2006.01) |
| C04B 35/565 | (2006.01) |
| C04B 35/626 | (2006.01) |
| C04B 35/628 | (2006.01) |
| B05D 3/00 | (2006.01) |
| B29C 65/00 | (2006.01) |

(Continued)

(52) U.S. Cl.
CPC ............ *C04B 35/806* (2013.01); *B05D 3/002* (2013.01); *B29C 66/712* (2013.01); *C04B 35/565* (2013.01); *C04B 35/6268* (2013.01); *C04B 35/62675* (2013.01); *C04B 35/62868* (2013.01); *C04B 35/62871* (2013.01); *C04B 35/62884* (2013.01); *C04B 35/62894* (2013.01); *C04B 35/62897* (2013.01); *C04B 35/80* (2013.01); *C04B 35/83* (2013.01); *B05D 2601/00* (2013.01); *B29K 2105/06* (2013.01); *B29K 2307/04* (2013.01); *B29L 2031/731* (2013.01); *C04B 2235/386* (2013.01); *C04B 2235/3826* (2013.01); *C04B 2235/425* (2013.01); *C04B 2235/5248* (2013.01); *C04B 2235/96* (2013.01)

(58) Field of Classification Search
CPC ... D01F 11/124; C04B 35/80; C04B 35/806; C04B 35/62868; C03C 16/342
See application file for complete search history.

(56) References Cited

U.S. PATENT DOCUMENTS

| 4,543,345 A | 9/1985 | Wei |
| 4,642,271 A | 2/1987 | Rice |

(Continued)

FOREIGN PATENT DOCUMENTS

| EP | 1679295 | 7/2006 |
| EP | 1867619 | 12/2007 |

(Continued)

OTHER PUBLICATIONS

U.S. Appl. No. 13/189,013, filed Jul. 22, 2011. Ceramic composite article having laminar ceramic matrix.

(Continued)

*Primary Examiner* — Karl Group
(74) *Attorney, Agent, or Firm* — Carlson, Gaskey & Olds, P.C.

(57) ABSTRACT

A method of fabricating a carbon fiber-reinforced article includes providing carbon fibers that have surfaces that include an initial interfacial bonding strength capacity with respect to bonding with boron nitride. The surfaces are then modified to reduce the initial interfacial bonding strength capacity. A layer of boron nitride is then deposited on the modified surfaces and the carbon fibers are then embedded in a ceramic matrix. A carbon fiber-reinforced article includes the carbon fibers, the layer of boron nitride on the surfaces of the carbon fibers, and the ceramic matrix. The article exhibits non-brittle fracture.

16 Claims, 4 Drawing Sheets

(51) Int. Cl.
  *B29K 105/06* (2006.01)
  *B29K 307/04* (2006.01)
  *B29L 31/00* (2006.01)

(56) References Cited

U.S. PATENT DOCUMENTS

| | | | |
|---|---|---|---|
| 4,752,503 A * | 6/1988 | Thebault | 427/248.1 |
| 4,808,076 A | 2/1989 | Jarmon et al. | |
| 4,960,629 A | 10/1990 | Jarmon et al. | |
| 4,994,416 A | 2/1991 | Tiegs et al. | |
| 5,026,604 A | 6/1991 | Thebault | |
| 5,094,901 A | 3/1992 | Gray | |
| 5,110,652 A | 5/1992 | Allaire et al. | |
| 5,132,169 A | 7/1992 | Olry et al. | |
| 5,134,020 A | 7/1992 | Cotteret et al. | |
| 5,188,878 A | 2/1993 | Takezawa et al. | |
| 5,246,736 A | 9/1993 | Goujard et al. | |
| 5,252,381 A | 10/1993 | Adler | |
| 5,275,844 A * | 1/1994 | Moore | 427/255.38 |
| 5,275,984 A | 1/1994 | Carpenter et al. | |
| 5,296,311 A | 3/1994 | McMurtry et al. | |
| 5,389,450 A | 2/1995 | Kennedy et al. | |
| 5,407,740 A | 4/1995 | Jessen | |
| 5,427,986 A | 6/1995 | Chyung et al. | |
| 5,433,915 A | 7/1995 | Yamamoto et al. | |
| 5,445,693 A | 8/1995 | Vane | |
| 5,476,685 A * | 12/1995 | Rocher et al. | 427/249.2 |
| 5,589,115 A | 12/1996 | Sherwood | |
| 5,593,728 A | 1/1997 | Moore et al. | |
| 5,682,594 A | 10/1997 | Kennedy et al. | |
| 5,707,471 A | 1/1998 | Petrak et al. | |
| 5,723,213 A | 3/1998 | Carpenter et al. | |
| 5,738,951 A | 4/1998 | Goujard et al. | |
| 5,817,432 A | 10/1998 | Chwastiak et al. | |
| 5,851,568 A | 12/1998 | Huang | |
| 5,945,062 A | 8/1999 | Chwastiak et al. | |
| 5,955,391 A | 9/1999 | Kameda et al. | |
| 6,217,997 B1 | 4/2001 | Suyama et al. | |
| 6,235,379 B1 | 5/2001 | Kameda et al. | |
| 6,291,058 B1 | 9/2001 | Goujard et al. | |
| 6,350,713 B1 | 2/2002 | Petrak | |
| 6,451,416 B1 | 9/2002 | Holowczak et al. | |
| 6,555,174 B2 | 4/2003 | Yamaji et al. | |
| 6,670,026 B2 | 12/2003 | Steibel et al. | |
| 6,743,393 B1 | 6/2004 | Petrak | |
| 6,764,974 B2 | 7/2004 | Ohji et al. | |
| 7,223,465 B2 | 5/2007 | Subramanian et al. | |
| 7,247,212 B2 | 7/2007 | Kostar et al. | |
| 7,306,826 B2 | 12/2007 | Subramanian et al. | |
| 7,329,101 B2 | 2/2008 | Carper et al. | |
| 7,381,445 B2 * | 6/2008 | Brun | 427/163.2 |
| 7,427,428 B1 | 9/2008 | DiCarlo et al. | |
| 7,507,466 B2 | 3/2009 | Steibel et al. | |
| 7,510,742 B2 | 3/2009 | Kmetz | |
| 7,597,838 B2 | 10/2009 | Subramanian et al. | |
| 7,687,016 B1 | 3/2010 | DiCarlo et al. | |
| 7,867,554 B2 | 1/2011 | Kmetz | |
| 2001/0026868 A1 | 10/2001 | Hanzawa et al. | |
| 2002/0019306 A1 | 2/2002 | Petrak | |
| 2002/0066409 A1 | 6/2002 | Brun | |
| 2002/0141610 A1 | 10/2002 | Devantier et al. | |
| 2002/0155269 A1 | 10/2002 | Holowczak et al. | |
| 2005/0084377 A1 | 4/2005 | Dambrine et al. | |
| 2005/0186069 A1 | 8/2005 | Subramanian et al. | |
| 2005/0233127 A1 | 10/2005 | Steffier | |
| 2006/0115648 A1 | 6/2006 | Chen | |
| 2006/0147692 A1 | 7/2006 | Kmetz | |
| 2006/0293167 A1 * | 12/2006 | Hitomi et al. | 501/127 |
| 2007/0117484 A1 | 5/2007 | Kmetz | |
| 2007/0161493 A1 * | 7/2007 | Komatsu et al. | 501/97.2 |
| 2009/0088038 A1 | 4/2009 | Kmetz | |
| 2009/0178618 A1 | 7/2009 | Kmetz | |
| 2012/0082832 A1 | 4/2012 | Flandermeyer et al. | |
| 2012/0301691 A1 | 11/2012 | Charleux et al. | |

FOREIGN PATENT DOCUMENTS

| | | |
|---|---|---|
| EP | 2028216 | 2/2009 |
| EP | 2210868 | 7/2010 |
| FR | 2401888 | 3/1979 |
| JP | 57077320 | 5/1982 |
| JP | 19930102778 | 11/1994 |
| JP | 2002266216 | 9/2002 |
| JP | 2004098493 | 4/2004 |
| JP | 2004174730 | 6/2004 |
| WO | 9921805 | 5/1999 |
| WO | 2010063946 | 6/2010 |

OTHER PUBLICATIONS

International Preliminary Report on Patentability for PCT Application No. PCT/US2013/077376, mailed Jul. 9, 2015.
European Search Report for European Patent Application No. 13869440 completed Nov. 19, 2015.

* cited by examiner

CARBON FIBER-REINFORCED ARTICLE AND METHOD THEREFOR

BACKGROUND

This disclosure relates to the use of carbon fibers in ceramic matrix composites.

Fiber-reinforced composites are known and used in aerospace applications, for example. Ceramic matrix composites are one classification of fiber-reinforced composite materials. A ceramic matrix composite can include inorganic fibers, such as ceramic fibers or glass fibers, metallic fibers or carbon fibers. Carbon fibers decompose in hot, oxidizing environments and thus are typically not used in ceramic matrix composites that are intended for such end use conditions.

SUMMARY

A method of fabricating a carbon fiber-reinforced article according to an exemplary aspect of the present disclosure includes providing a plurality of carbon fibers. The plurality of carbon fibers includes surfaces that have an initial interfacial bonding strength capacity with respect to bonding with boron nitride. The surfaces are then modified to reduce the initial interfacial bonding strength capacity. A layer of boron nitride is then deposited on the modified surfaces. The plurality of carbon fibers are then embedded in a ceramic matrix to provide a carbon fiber-reinforced article.

In a further non-limiting embodiment of any of the foregoing examples, the ceramic matrix is silicon carbide.

In a further non-limiting embodiment of any of the foregoing examples, the surfaces of the plurality of carbon fibers are free of any ceramic coating prior to the depositing of the layer of boron nitride.

In a further non-limiting embodiment of any of the foregoing examples, the modifying includes heat treating the plurality of carbon fibers at a temperature greater than 1200° C.

In a further non-limiting embodiment of any of the foregoing examples, the modifying includes heat treating the plurality of carbon fibers at a temperature of 1550-1650° C.

In a further non-limiting embodiment of any of the foregoing examples, the modifying includes heat treating the plurality of carbon fibers at a temperature of 1600° C.

In a further non-limiting embodiment of any of the foregoing examples, the plurality of carbon fibers are as-received fibers.

A further non-limiting embodiment of any of the foregoing examples includes depositing the layer of boron nitride by chemical vapor deposition.

In a further non-limiting embodiment of any of the foregoing examples, the layer of boron nitride is in contact with the modified surfaces of the plurality of carbon fibers, and the ceramic matrix is silicon carbide that is in contact with the layer of boron nitride.

In a further non-limiting embodiment of any of the foregoing examples, the layer of boron nitride deposited on the modified surfaces consists of boron nitride.

In a further non-limiting embodiment of any of the foregoing examples, the plurality of carbon fibers includes graphite.

In a further non-limiting embodiment of any of the foregoing examples, the modifying includes ordering microstructural stacking faults in a graphitic microstructure of the plurality of carbon fibers.

In a further non-limiting embodiment of any of the foregoing examples, the ceramic matrix is predominantly silicon carbide.

In a further non-limiting embodiment of any of the foregoing examples, the depositing of the layer of boron nitride is conducted after the modifying of the surfaces, free of any other surface modifications to the plurality of carbon fibers.

A carbon fiber-reinforced article according to an exemplary aspect of the present disclosure includes a plurality of carbon fibers, a layer of boron nitride on surfaces of the plurality of carbon fibers, and a ceramic matrix in which the plurality of carbon fibers are embedded. The plurality of carbon fibers have been modified prior to fabrication of the carbon fiber-reinforced article to reduce an initial interfacial bonding strength capacity of surfaces of the plurality of carbon fibers with respect to bonding with the boron nitride such that the carbon fiber-reinforced article exhibits non-brittle fracture.

In a further non-limiting embodiment of any of the foregoing examples, the ceramic matrix is silicon carbide.

In a further non-limiting embodiment of any of the foregoing examples, the layer of boron nitride is in contact with the surfaces of the plurality of carbon fibers, and the ceramic matrix is silicon carbide that is in contact with the layer of boron nitride.

A method of fabricating an oxidation-resistant carbon fiber, according to an exemplary aspect of the present disclosure includes at least one carbon fiber. The at least one carbon fiber includes a surface that has an initial interfacial bonding strength capacity with respect to bonding with boron nitride which modifies the surface to reduce the initial interfacial bonding strength capacity, and deposits a layer of boron nitride on the modified surface.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
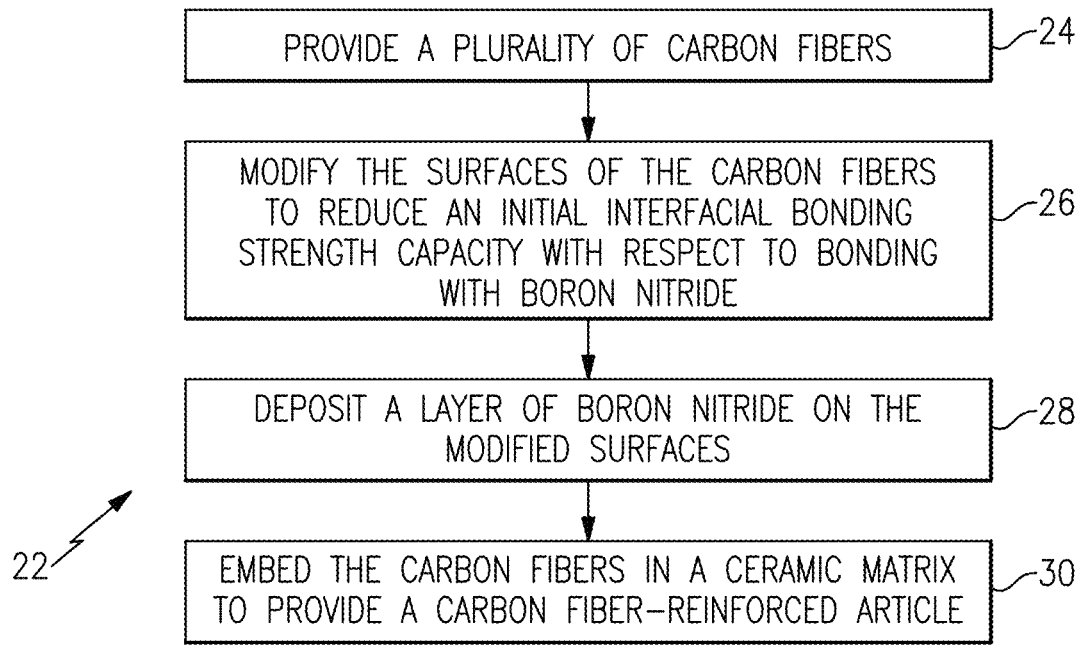
FIG. 1 illustrates an example method of fabricating a carbon fiber-reinforced article.
Figure 2:
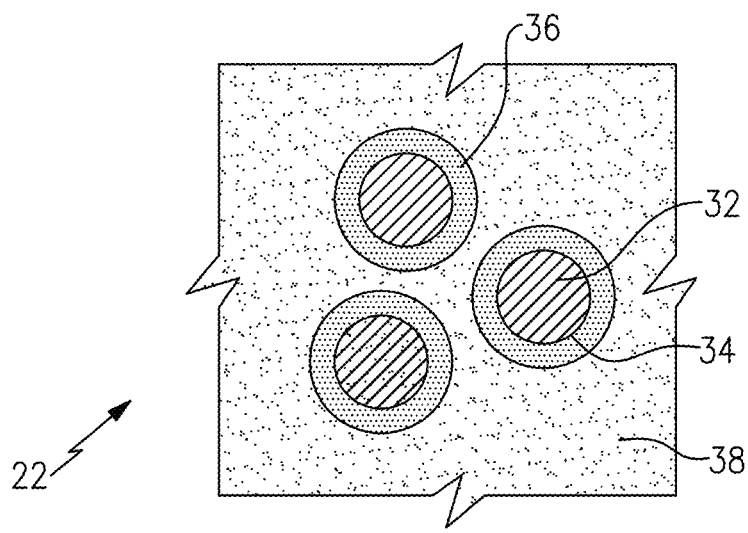
FIG. 2 illustrates an example carbon fiber-reinforced article.

FIG. 1 illustrates an example of a method 20 of fabricating a carbon fiber-reinforced article 22, which is schematically shown in FIG. 2. As will be described, the method 20 can be used to fabricate a carbon fiber ceramic matrix composite, which can be used in a variety of different applications, including aerospace applications.

Although carbon fibers generally have good mechanical properties that are desirable for composites, the practical incorporation of carbon fibers into ceramic matrix composites has been limited by poor oxidation resistance of carbon fibers. An oxidation-resistant coating, such as a layer of boron nitride (BN), can be used on carbon fibers to enhance the oxidation resistance. However, the deposition of boron nitride onto the carbon fibers can cause decomposition of the carbon fibers, thus reducing mechanical properties and negating the benefit of the enhanced oxidation resistance. As will be described below, the method 20 provides a technique for applying a layer of boron nitride onto the carbon fibers to obtain enhanced oxidation resistance, without decomposing the carbon fibers and sacrificing the mechanical properties thereof.

As generally shown in FIG. 1, the method 20 includes steps 24, 26, 28 and 30 for fabricating the carbon fiber-reinforced article 22. As can be appreciated, the steps 24, 26, 28 and 30 can, except where otherwise discussed herein, be utilized in combination with other processing steps as desired.

At step 24, a plurality of carbon fibers is provided. For example, the carbon fibers include graphite and are as-received carbon fibers (e.g., 'TORAY' T300) from a carbon fiber manufacturer. The term "as-received" refers to carbon fibers that have been completely processed with respect to the formation of the fibers from precursor materials and any sizing treatments that are applied to the fibers prior to their being ready for incorporation into a composite material. In this regard, the carbon fibers can be free of any ceramic coatings thereon, although the fibers may have a sizing provided by the manufacturer. The carbon fibers can be provided in an arrangement desired for the end use. For example, the carbon fibers can be in a uni-directional arrangement, a fabric, a three-dimensional fiber structure or the like.

The carbon fibers have surfaces that define an initial interfacial bonding strength capacity with respect to bonding with boron nitride. For example, in the as-received state, with no further surface treatments, the surfaces of the carbon fibers have the capacity to provide an interfacial bonding strength with an applied layer of boron nitride. In this initial state, the carbon fibers bond relatively strongly with an applied layer of boron nitride to ultimately provide relatively strong bonding with a ceramic matrix. Such an article exhibits brittle fracture and is therefore not suitable where a toughened ceramic matrix composite is desired.

At step 26 of the method 20, the surfaces of the carbon fibers are modified to reduce the initial interfacial bonding strength capacity. By reducing the initial interfacial bonding strength capacity, the bond that is later formed with an applied layer of boron nitride is relatively weaker such that the final carbon fiber-reinforced article 22 exhibits non-brittle fracture.

As an example, step 26 includes modifying the surfaces by heat treating the carbon fibers at an elevated temperature in a non-oxidizing environment. In one example, the heat treatment temperature is 1200° C. or greater. In a further example, the heat treating temperature is 1550-1650° C., and nominally can be 1600° C. The non-oxidizing environment is free or substantially free of oxygen and predominantly includes argon or other gas that is unreactive with respect to the carbon fibers. The pressure of the non-oxidizing environment can vary, but in one example was approximately one atmosphere. In other examples, the pressure of the non-oxidizing environment can be sub-atmospheric pressure. The heat treatment time can be one to ten hours, and can nominally be four hours, with a 2° C. per minute heating rate to the target heat treatment temperature.

After modifying the surfaces of the carbon fibers at step 26, a layer of boron nitride is deposited onto the modified surfaces at step 28. Without the modification at step 26, the deposition of boron nitride onto carbon fibers can degrade the carbon fibers such that the final article exhibits poor mechanical properties. However, the modification at step 26 reduces or eliminates decomposition of the carbon fibers during the deposition of the boron nitride layer at step 28 such that the final article exhibits good strength, as represented by the examples in Table 1 below.

TABLE 1

Ultimate Tensile Strength of Uni-Directional, Single Strand C/BN/SiC Composite

| | Heat Pre-Treatment Temperature | | | |
|---|---|---|---|---|
| | "As-Received" | 1200° C. | 1300° C. | 1600° C. |
| Average break FORCE (lbs.) | Immeasurably Small | 27.8 | 36.6 | 36.9 |
| Stdev. lbs. | n/a | n/a | 1.0 | 4.0 |
| n | | 10 | 2 | 3 | 3 |
| Average break STRESS (KSI) | Immeasurably Small | n/a | | 70.2 |

In one example of the depositing of the layer of boron nitride at step 28, the deposition includes depositing the boron nitride by chemical vapor deposition. The deposition of boron nitride by chemical vapor deposition is known and can include, but is not limited to, reacting boron chloride with ammonia. As can be appreciated, however, the layer of boron nitride can alternatively be deposited onto the carbon fibers using other deposition techniques.

At step 30, the carbon fibers with the layer of boron nitride are embedded in a ceramic matrix to provide the carbon fiber-reinforced article 22. The embedding of the carbon fibers in the ceramic matrix can include, but is not limited to, depositing the ceramic matrix using chemical vapor infiltration. As can be appreciated, however, the ceramic matrix can alternatively be deposited using other techniques. In one example, the ceramic matrix predominantly includes silicon carbide (SiC). In another example, the ceramic matrix includes only silicon carbide and impurities.

In one alternative, if the carbon fibers will be used for another purpose rather than in a ceramic matrix composite, the embedding of step 30 can be excluded. For example, at step 24 one or more carbon fibers are provided. The one or more carbon fibers are then modified at step 26 and then the layer of boron nitride is deposited at step 28, as described. For example, the one or more carbon fibers can then be used as a "leader cloth," with enhanced oxidation resistance and extended life, in the processing of other kinds of fibers, such as silicon carbide.

In a further example of the method 20, the layer of boron nitride is deposited onto the modified surfaces of the carbon fibers directly after the modification in step 26. That is, there are no additional intervening surface modifications of the carbon fibers between the modification in step 26 and the deposition in step 28.

FIG. 2 shows a representative portion of a carbon fiber-reinforced article 22 (hereafter "article 22"). Although only a portion of the article 22 is shown, the article 22 can be fabricated in a desired geometry for the intended end use. The article 22 includes a plurality of carbon fibers 32 that each includes peripheral surfaces 34. A layer 36 of boron nitride is located on each of the surfaces 34 such that the layers 36 contact the carbon fibers 32. In this example, the layers 36 continuously circumscribe the cross-sections of the carbon fibers 32. The thickness of the layer 36 can be varied by controlling the deposition parameters in a known manner. In one example the thickness of the layer 36 is 50-500 nanometers, and can nominally be 50-150 nanometers.

The layer 36 of boron nitride enhances the oxidation resistance of the carbon fibers 32. For example, the carbon fibers are stable up to 625° C. in air without the layer 36, and the carbon fibers 32 are stable up to 825° C. in air with the layer 36. Further, the deposition of the layer 36 does not decompose the carbon fibers and reduce strength. Table 2 below shows further examples of the oxidation resistance.

TABLE 2

Oxidation of Uni-Directional Single Strand C/BN/SiC; Fiber/Coating: C/BN (3 hours CVD-BN), Fiber Type: 1600° C., Ar, 4 hrs, 2° C./min, 50 torr (8H-S).

| 3K tows | Non-Oxidized (As fabricated) | 12 Hours @ 1000° C. in Air | 100 Hours @ 1000° C. in Air |
|---|---|---|---|
| Break Stress Tensile Avg. | 40.0 KSI | 51.4 KSI | 53.6 KSI |
| Std Dev. | 7.8 | 9.6 | 4.8 |
| n | 4 | 10 | 6 |

Figure 3:
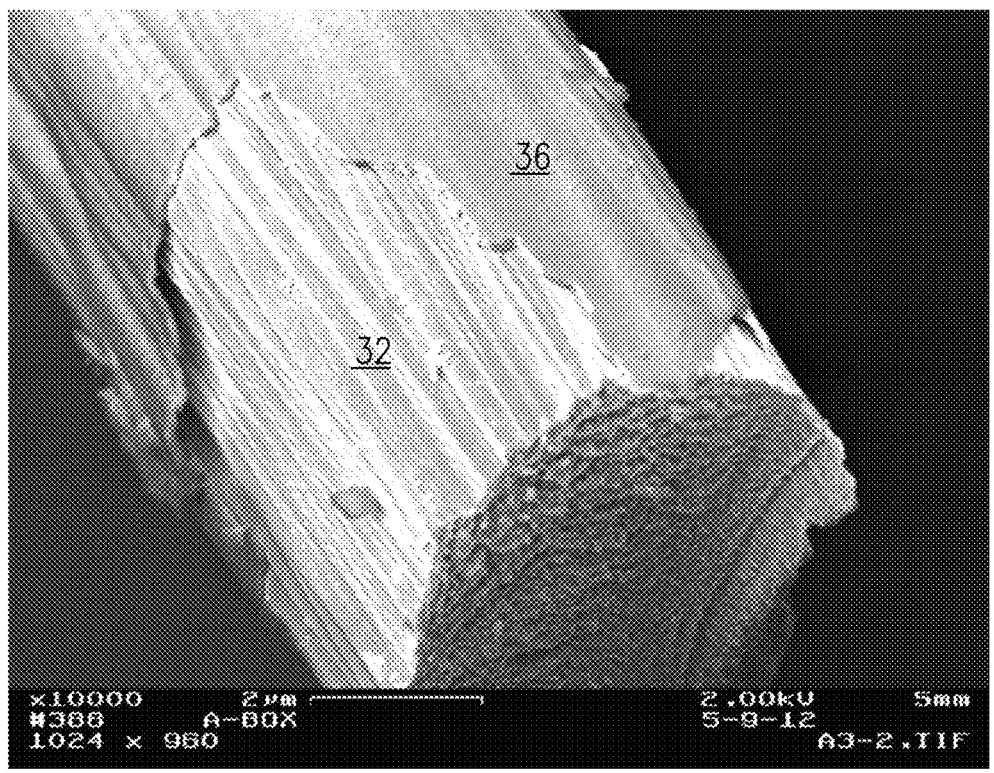
FIG. 3 illustrates an isolated view of a carbon fiber having a layer of boron nitride.

FIG. 3 shows an isolated view of one of the carbon fibers 32 and the layer 36 of boron nitride, partially removed to reveal the underlying carbon fiber 32. One or more additional layers of boron nitride or other material can optionally be used on the layer 36. For example, an additional silicon-containing layer, such as silicon nitride ($Si_3N_4$) is used.

Figure 4:
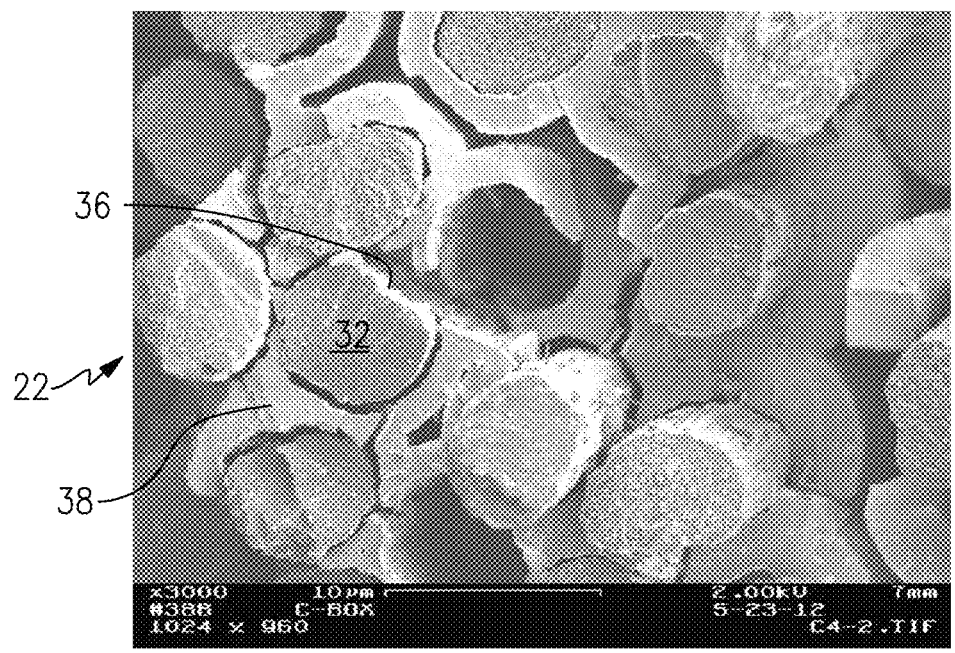
FIG. 4 illustrates a fracture surface of a carbon fiber-reinforced article fabricated according to the method shown in FIG. 1.
Figure 5:
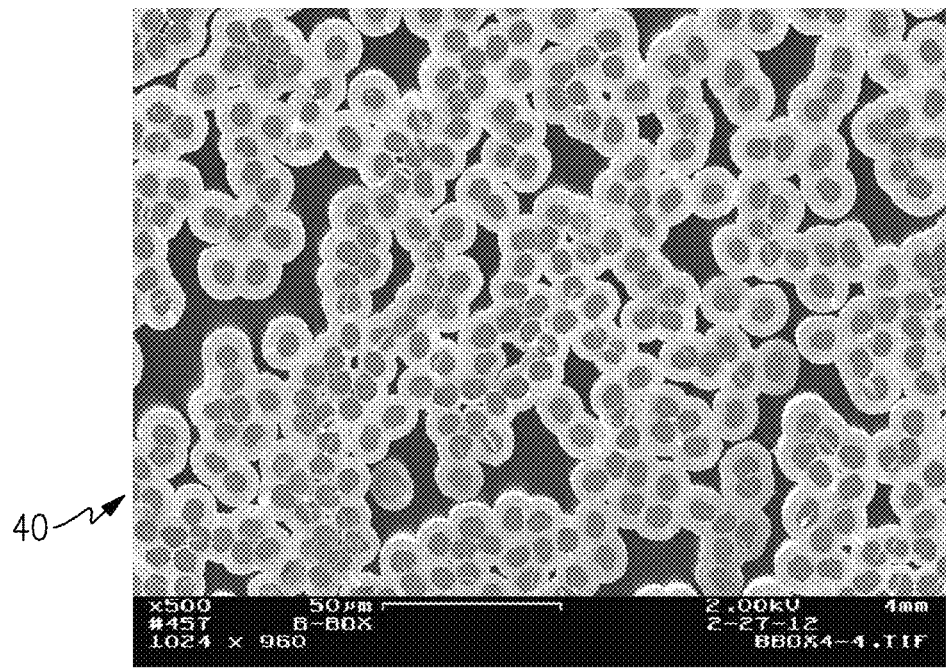
FIG. 5 illustrates a fracture surface of a carbon fiber-reinforced article fabricated without the surface modification according to the method shown in FIG. 1.

The carbon fibers 32 are embedded in a ceramic matrix 38. As discussed above, the carbon fibers 32 have been modified prior to fabrication of the article 22 to reduce the initial interfacial bonding strength capacity of the surfaces 34 with respect to bonding with the boron nitride 36 such that the article 22 exhibits non-brittle fracture. FIG. 4 shows an example of the non-brittle behavior. For comparison, FIG. 5 shows a fracture surface of a carbon fiber-reinforced article 40 that is similar to the article 22 but does not utilize the surface modification of step 26 of the method 20. As shown in FIG. 4, the fracture surface exhibits several toughening mechanisms, including de-bonding between the matrix 38 and the fibers 32, fiber pull-out represented by holes 42, crack deflection along the interfacial surfaces between the fibers 32 and the matrix 38, and fiber tensile fracture. In comparison, as shown in FIG. 5, the fracture surface of article 40 is relatively smooth and does not exhibit any of the toughening mechanisms of the fracture surface of the article 22.

Figure 6:
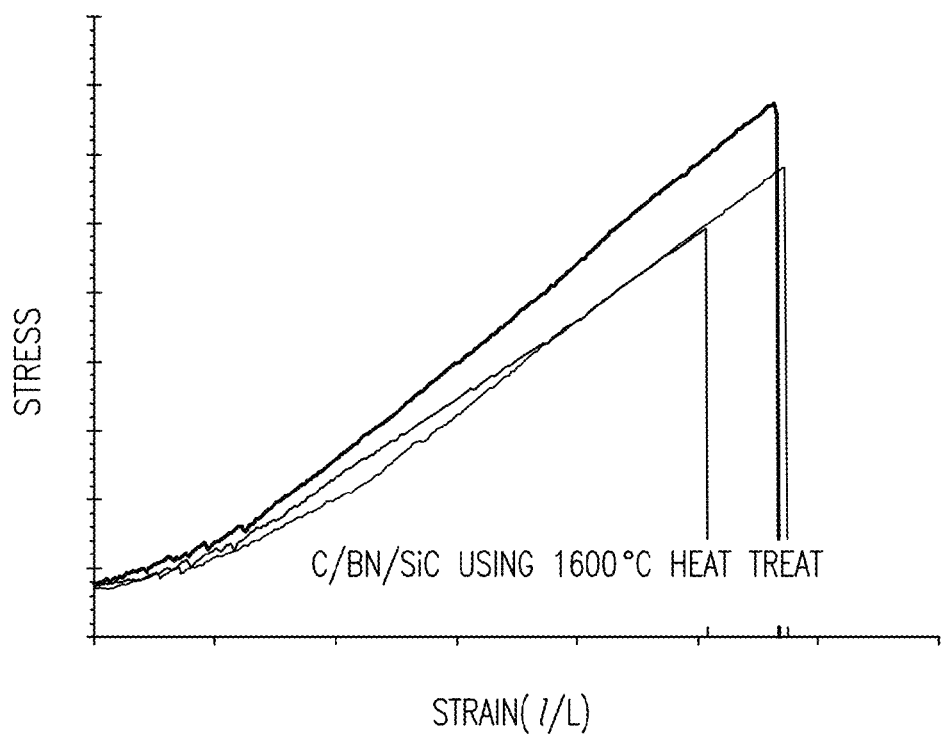
FIG. 6 illustrates an example tensile testing result of a carbon fiber-reinforced article.

FIG. 6 shows a tensile stress testing result for a uni-directional composite, similar to the article 22, fabricated according to the method 20 by modifying the carbon fibers at 1600° C. for four hours in an argon environment at a pressure of one atmosphere. As shown, the area under the curves of the three samples indicates toughening.

Figure 7:
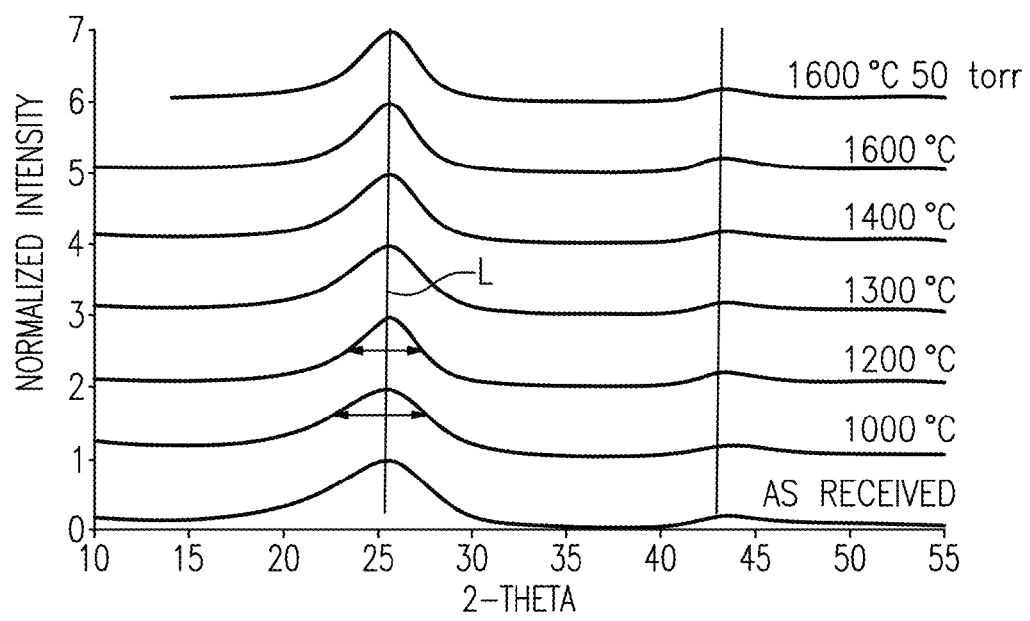
FIG. 7 illustrates x-ray diffraction patterns for samples processed at conditions.

Without being limited to any particular theory, the modification to the surfaces of the carbon fibers at step 26 of the method 20 is believed to order microstructural stacking faults of the graphite microstructure of the carbon fibers. FIG. 7 shows x-ray diffraction patterns for samples processed under different surface modification temperatures from 1000° C. to 1600° C. at step 26 of the method 20, including one sample with no modification. In each of the patterns there is a peak that is generally aligned along line L. The peak represents graphite. The peak of the as-received carbon fibers with no surface modification is relatively broad. With increasing temperature, the peak progressively narrows, indicating ordering of the graphite microstructure. This suggests that the ordering contributes to the surface modification to reduce the initial interfacial bonding strength capacity with respect to the boron nitride.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method of fabricating a carbon fiber-reinforced article, the method comprising:
   providing a plurality of carbon fibers, the plurality of carbon fibers including surfaces;
   ordering microstructural stacking faults in a graphitic microstructure of the surfaces of the plurality of carbon fibers;
   depositing a layer of boron nitride on the surfaces;
   depositing a silicon-containing layer on the layer of boron nitride: and
   embedding the plurality of carbon fibers in a ceramic matrix to provide a carbon fiber-reinforced article.

2. The method as recited in claim 1, wherein the ceramic matrix is silicon carbide.

3. The method as recited in claim 1, wherein the surfaces of the plurality of carbon fibers are free of any ceramic coating prior to the depositing of the layer of boron nitride.

4. The method as recited in claim 1, wherein the plurality of carbon fibers are as-received fibers.

5. The method as recited in claim 1, including depositing the layer of boron nitride by chemical vapor deposition.

6. The method as recited in claim 1, wherein the layer of boron nitride is in contact with the surfaces of the plurality of carbon fibers, and the ceramic matrix is silicon carbide that is in contact with the layer of boron nitride.

7. The method as recited in claim 1, wherein the layer of boron nitride deposited on the surfaces consists of boron nitride.

8. The method as recited in claim 1, wherein the ceramic matrix is predominantly silicon carbide.

9. The method as recited in claim 1, wherein the depositing of the layer of boron nitride is conducted after the ordering, free of any other surface modifications to the plurality of carbon fibers.

10. A method of fabricating an oxidation-resistant carbon fiber, the method comprising:
    providing at least one carbon fiber, the at least one carbon fiber including an exposed surface;
    ordering microstructural stacking faults in a graphitic microstructure of the exposed surface; and
    depositing a layer of boron nitride on the exposed surface, the layer of boron nitride having a thickness of 50-150 nanometers.

11. The method as recited in claim 1, wherein the ordering is concluded prior to the depositing of the layer of boron nitride.

12. The method as recited in claim 1, wherein the carbon fiber-reinforced article exhibits non-brittle fracture.

13. The method as recited in claim 1, wherein the layer of boron nitride has a thickness of 50-150 nanometers.

14. The method as recited in claim 1, wherein the silicon-containing layer is silicon nitride.

15. The method as recited in claim 10, further comprising depositing a silicon-containing layer on the layer of boron nitride.

16. The method as recited in claim 15, wherein the silicon-containing layer is silicon nitride.

* * * * *